US012677989B2

(12) United States Patent
Wang

(10) Patent No.: US 12,677,989 B2
(45) Date of Patent: Jul. 14, 2026

(54) SMART ELECTRIC OVEN

(71) Applicant: Haohong Electric Technology (Hubei) Co., Ltd., Huanggang (CN)

(72) Inventor: Min Wang, Huanggang (CN)

(73) Assignee: Haohong Electric Technology (Hubei) Co., Ltd., Huanggang (CN)

( * ) Notice: Subject to any disclaimer, the term of this patent is extended or adjusted under 35 U.S.C. 154(b) by 267 days.

(21) Appl. No.: 18/460,983

(22) Filed: Sep. 5, 2023

(65) Prior Publication Data

US 2025/0009173 A1 Jan. 9, 2025

(30) Foreign Application Priority Data

Jul. 4, 2023 (CN) .......................... 202310816670.X

(51) Int. Cl.
*A47J 37/06* (2006.01)

(52) U.S. Cl.
CPC ....... *A47J 37/0629* (2013.01); *A47J 37/0664* (2013.01)

(58) Field of Classification Search
CPC ................ A47J 37/0629; A47J 37/0623; A47J 37/0664; A47J 37/06; A47J 37/067; A47J 37/0709; A47J 41/0072
See application file for complete search history.

(56) References Cited

U.S. PATENT DOCUMENTS

| | | | | | |
|---|---|---|---|---|---|
| 5,582,094 | A | * | 12/1996 | Peterson | A47J 37/0786 99/425 |
| 7,640,929 | B2 | * | 1/2010 | Johnson | A47J 37/0713 126/41 R |

| | | | | | |
|---|---|---|---|---|---|
| 2006/0225580 | A1 | * | 10/2006 | Fernandez | A47J 37/0623 99/419 |
| 2011/0049125 | A1 | | 3/2011 | Home | |
| 2013/0276643 | A1 | * | 10/2013 | Krolick | F24B 1/003 99/447 |
| 2016/0051089 | A1 | * | 2/2016 | Ahmed | F24C 7/087 126/25 R |

(Continued)

FOREIGN PATENT DOCUMENTS

| | | |
|---|---|---|
| CN | 105628252 A | 6/2016 |
| CN | 107928438 A | 4/2018 |

(Continued)

OTHER PUBLICATIONS

European Search Report issued in counterpart European Patent Application No. EP 23197490.8, dated Jan. 31, 2024.

(Continued)

*Primary Examiner* — Thuyhang N Nguyen
(74) *Attorney, Agent, or Firm* — Westbridge IP LLC

(57) ABSTRACT

Disclosed is a smart electric oven. The smart electric oven includes a furnace body, a heating device and a cover. The cover can be covered on the furnace body, the cover and the furnace body is formed with a heating space, and the heating device is arranged in the heating space. The cover and/or the furnace body is formed with a heat preservation space to slow down the heat loss in the heating space. The technical solution of the present application can slow down the heat loss speed in the heating space, and maintain the heating space in a relatively high temperature range, thereby improving the heat preservation effect of the smart electric oven.

11 Claims, 6 Drawing Sheets

(56)          References Cited

U.S. PATENT DOCUMENTS

| 2016/0073664 | A1 | * | 3/2016 | Barrows | ............... | A47J 27/004 |
| | | | | | | 99/323.5 |
| 2018/0004271 | A1 | * | 1/2018 | Knappenberger | ........ | G06F 1/26 |

FOREIGN PATENT DOCUMENTS

| CN | 112273998 | A | | 1/2021 | | |
| CN | 213605927 | U | | 7/2021 | | |
| CN | 214856144 | U | | 11/2021 | | |
| CN | 112273998 | B | * | 3/2022 | .......... | A47J 37/0629 |
| CN | 114847770 | A | | 8/2022 | | |
| DE | 202023000268 | U1 | | 6/2023 | | |
| GB | 1564972 | A | | 4/1980 | | |
| KR | 20220077064 | A | | 6/2022 | | |
| WO | WO-2006061499 | A1 | * | 6/2006 | .......... | A47J 36/2483 |

OTHER PUBLICATIONS

First Office Action issued in counterpart Chinese Patent Application No. 202310816670.X, dated Sep. 27, 2025.

\* cited by examiner

10

314

SMART ELECTRIC OVEN

CROSS-REFERENCE TO RELATED APPLICATIONS

This application claims priority to Chinese Patent Application No. 202310816670.X, filed on Jul. 4, 2023, the entire contents of which are incorporated herein by reference.

TECHNICAL FIELD

The present application relates to the technical field of food cooking equipment, and in particular to a smart electric oven.

BACKGROUND

An electric oven is a cooking device that uses electric heating to grill food. It is a popular cooking method to put food on the grill or grill pan of the electric oven for grilling. Especially when it is used outdoors, people usually want to enjoy delicious food as quickly as possible while the electric oven satisfies the demand. Based on the above requirements, how to design an electric oven with good thermal insulation effect is a technical problem to be solved.

SUMMARY

The main purpose of the present application is to provide a smart electric oven, aiming at improving the heat preservation effect of the smart electric oven.

In order to achieve the above purpose, the present application provides a smart electric oven, including: a furnace body; a heating device; and a cover. The cover is configured to be covered on the furnace body, and a heating space is formed between the cover and the furnace body; the heating device is provided in the heating space; a heat preservation space is formed in the cover and/or the furnace body to slow down heat loss in the heating space.

In an embodiment, when the heat preservation space is formed in the cover, the cover includes a cover inner shell and a cover outer shell, and the cover outer shell and the cover inner shell are enclosed to form the heat preservation space; the cover inner shell is provided close to the furnace body, and the cover inner shell and the furnace body are enclosed to form the heating space.

In an embodiment, when the heat preservation space is formed in the furnace body, the furnace body includes a furnace inner shell and a furnace outer shell, and the furnace outer shell and the furnace inner shell are enclosed to form the heat preservation space; the furnace inner shell is provided close to the cover, and the furnace inner shell and the cover are enclosed to form the heating space.

In an embodiment, the heating device includes a heating pipe and a connector; the heating pipe is rotatably connected to the connector, and the connector is provided on the furnace body; the heating pipe can rotate around the connector.

In an embodiment, the smart electric oven further includes a cover handle; one side of the cover is hinged to the furnace body, and the cover handle is provided on the other side of the cover; the cover handle is provided with a grip part, and the grip part is protrudingly provided on an edge of the cover.

In an embodiment, the cover inner shell and the cover outer shell are provided with vent holes correspondingly, and the vent holes are configured to connect the heating space, the heat preservation space and an external space, so that the vent holes discharge oil fume generated by heating food in the heating space to the external space.

In an embodiment, the cover outer shell is provided with a deflector cap corresponding to the vent hole, and the deflector cap is configured to change an emission direction of the oil fume generated in the heating space.

In an embodiment, the furnace inner shell is provided with an oil discharge device, and a bottom of the furnace inner shell presents an arc-shaped surface as a whole; the arc-shaped surface is concave relative to the ground, and the oil discharge device is provided at a lowest point of the arc-shaped surface of the furnace inner shell; the oil discharge device is provided in an inverted V-shaped arch, and two symmetrical oil discharge holes are provided in a length direction of the inverted V-shaped arch.

In an embodiment, an opening is provided at a bottom of the furnace outer shell; the opening is provided directly below the oil discharge device, so as to allow oil stains and/or residues generated by the smart electric oven to heat food pass through the oil discharge hole.

In an embodiment, the furnace body further includes a temperature control unit, and the temperature control unit is installed on the furnace body and electrically connected with the heating device; the temperature control unit includes a microprocessor, a first temperature sensor, a power supply and a display; the power supply is electrically connected to the microprocessor, and the power supply is configured to supply power to the microprocessor; the first temperature sensor is electrically connected to the microprocessor, and the first temperature sensor is configured to detect the temperature in the heating space; the microprocessor is electrically connected to the display, and the microprocessor controls the display to display the temperature in the heating space; the microprocessor is electrically connected to the heating device, and the microprocessor can also control a heating state of the heating device.

In an embodiment, the furnace body further includes a second temperature sensor interface; the second temperature sensor interface is configured to connect a second temperature sensor externally, and the second temperature sensor can be configured to detect a temperature of food in the heating space; the second temperature sensor interface is electrically connected with the microprocessor, the microprocessor controls the display, and the display can display the temperature of the food.

In an embodiment, the temperature control unit further includes a control knob, and the control knob is sleeved on the display; the control knob is provided with a circuit connection part, and the circuit connection part is configured to be electrically connected with the microprocessor.

In an embodiment, the furnace body further includes a frying and grilling assembly, and the frying and grilling assembly is provided close to the cover relative to the heating device; the frying and grilling assembly includes two parts, and the frying and grilling assembly includes a grilling shelf and/or a grilling pan.

The technical solution of the present application forms a heat preservation space inside the cover or the furnace body of the smart electric oven. The heating device in the smart electric oven releases heat in the heating space, and the heat can pass through the cover and/or the heat preservation space formed in the furnace body and the entities of the cover and the furnace body, and is then released to the external space to slow down the loss of heat and keep the heating space in a higher temperature range, thereby improving the thermal insulation effect of the smart electric oven and enabling users to enjoy the food as fast as possible.

Further, a heat preservation space is provided in the cover and/or the furnace body, and without changing the area of the cooking area of the smart electric oven and the external dimension of the smart electric oven, the heat preservation space is provided in the cover and/or the furnace body. The cover can be covered on the furnace body, and the cover and the furnace body form a heating space. The heat preservation space is provided close to the heating space to reduce the volume of the heating space. The smaller the volume of the heating space, the more heat accumulated per unit time, thereby further improving the heating speed of the smart electric oven, and allowing users to enjoy delicious food as quickly as possible.

BRIEF DESCRIPTION OF THE DRAWINGS

In order to more clearly illustrate the technical solutions in the embodiments of the present application or the related art, the following will briefly introduce the drawings that need to be used in the description of the embodiments or the related art. Obviously, the accompanying drawings in the following description are only some embodiments of the present application. For those skilled in the art, other drawings can also be obtained according to the structures shown in these drawings without creative effort.

Figure 1:
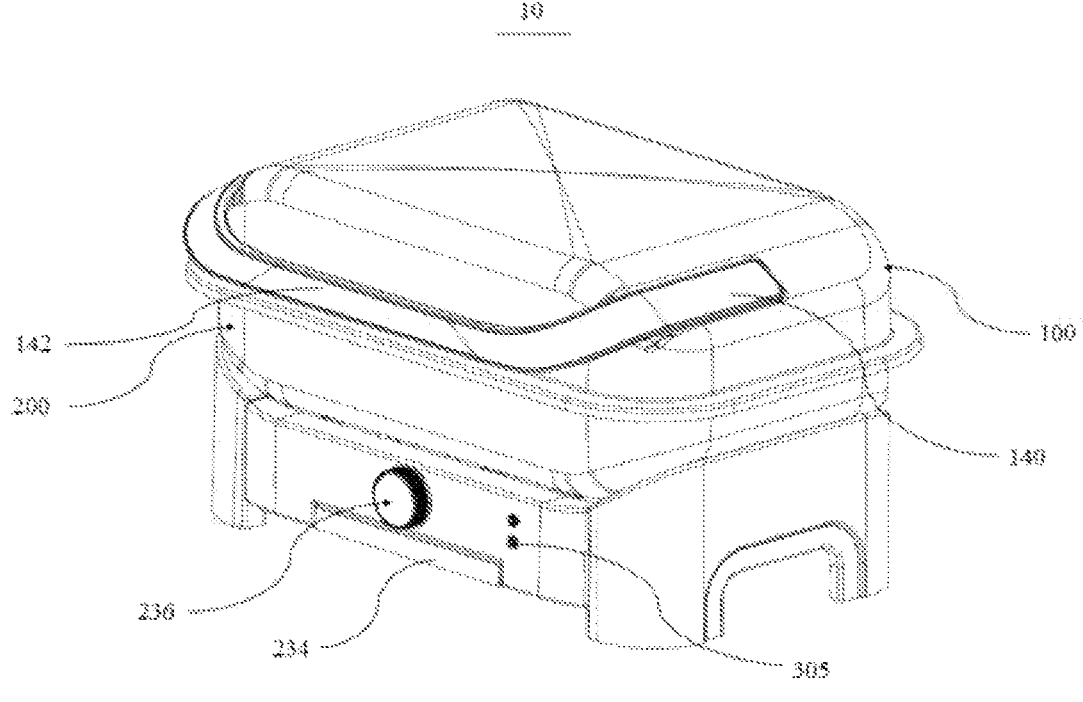
FIG. 1 is a schematic structural view of a smart electric oven according to an embodiment of the present application.
Figure 2:
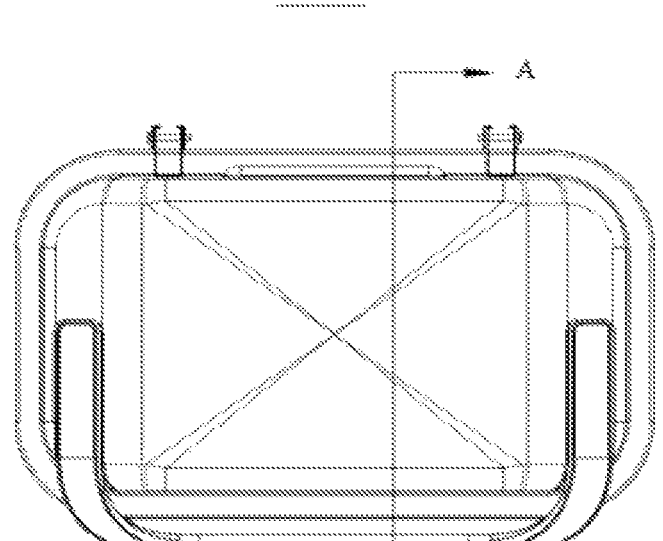
FIG. 2 is a top view of FIG. 1.

The realization of the purpose of the present application, functional characteristics and advantages will be further described with reference to the accompanying drawings in conjunction with the embodiments.

DETAILED DESCRIPTION OF THE EMBODIMENTS

The following will clearly and completely describe the technical solutions in the embodiments of the present application with reference to the accompanying drawings in the embodiments of the present application. Obviously, the described embodiments are only part of the embodiments of the present application, not all of them. Based on the embodiments of the present application, all other embodiments obtained by those skilled in the art without creative efforts fall within the protection scope of the present application.

It should be noted that all directional indications (such as up, down, left, right, front, back . . . ) in the embodiments of the present application are only used to explain the relative positional relationship, movement conditions, etc. between the components in a certain posture (as shown in the figure). If the specific posture changes, the directional indication will also change accordingly.

In addition, the description involving "first", "second" and so on in the present application are only for descriptive purpose, and should not be understood as indicating or implying their relative importance or implicitly indicating the quantity of the indicated technical features. Thus, the features defined as "first" and "second" may explicitly or implicitly include at least one of these features. In addition, the technical solutions of the various embodiments can be combined with each other, but it must be based on the realization of those skilled in the art. When the combination of technical solutions is contradictory or cannot be realized, it should be considered that the combination of technical solutions does not exist, nor within the protection scope required by the present application.

The present application provides a smart electric oven.

As shown in FIGS. 1 to 5, in an embodiment of the present application, the smart electric oven 10 includes a furnace body 200, a heating device 240, and a cover 100. The cover 100 can be covered on the furnace body 200, the cover 100 and the furnace body 200 form a heating space 220, and the heating device 240 is provided in the heating space 220. The cover 100 and/or the furnace body 200 is formed with a heat preservation space 12a and/or 12b to slow down the heat loss in the heating space 220.

It can be understood that the inside of the cover 100 or the furnace body 200 of the smart electric oven 10 forms the heat preservation space 12a and/or 12b, and the heating device 240 in the smart electric oven 10 releases heat in the heating space 220. The heat can pass through the heat preservation space 12a and/or 12b formed in the cover 100 and/or the furnace body 200 and the entities of the cover 100 and the furnace body 200, and then are released to the external space to slow down the loss of heat and maintain the heating space 220 at a relatively high temperature range, so that the heat preservation effect of the smart electric oven 10 is improved, and the user can enjoy delicious food as quickly as possible.

Further, the heat preservation space 12a and/or 12b are provided in the cover 100 and/or the furnace body 200, without changing the area of the cooking area of the smart electric oven 10 and the external dimensions of the smart electric oven 10, the heat preservation space 12a and/or 12b is provided in the cover 100 and/or the furnace body 200. The cover 100 can be covered on the furnace body 200, and a heating space 220 is formed between the cover 100 and the furnace body 200. The heat preservation space 12a and/or 12b is provided close to the heating space 220 to reduce the volume of the heating space 220. The smaller the volume of the heating space 220, the more heat accumulated per unit time, thus the heating speed of the smart electric oven 10 is further improved, and the user can enjoy delicious food as quickly as possible.

In an embodiment, in order to meet the requirements of high-temperature cooking of food, both the cover 100 and the furnace body 200 are made of metal material.

Further, in order to facilitate users to clean the heating space 220 in the furnace body 200, the heating device 240 includes a heating pipe 241 and a connector 242. The heating pipe 241 is rotatably connected to the connector 242, the connector 242 is disposed on the furnace body 200, and the heating pipe 241 can rotate around the connector 242. When the user needs to clean the furnace body 200, the heating pipe 241 can be rotated around the connector 242 to a certain angle, so that the user can directly clean the furnace body 200.

It can be understood that the smart electric oven 10 also includes a power supply 303. The heating pipe 241 is rotatably connected to the connector 242, and the connector 242 is configured to communicate with the electrical connection between the heating pipe 241 and the power supply 303. The power supply 303 provides energy for the heating pipe 241.

In an embodiment of the present application, when the heat preservation space 12a is formed in the cover 100, the cover 100 includes a cover inner shell 110 and a cover outer shell 130, and the cover outer shell 130 and the cover inner shell 110 encloses the heat preservation space 12a; the cover inner shell 110 is disposed close to the furnace body 200, and the cover inner shell 110 and the furnace body 200 enclose to form the heating space 220.

It can be understood that the cover inner shell 110 and the cover outer shell 130 can be integrally formed, or welded and/or riveted and/or clamped and/or screwed. In an embodiment, in order to facilitate the user to clean the heat preservation space 12a and facilitate the user to disassemble, the connection mode of the cover inner shell 110 and the cover outer shell 130 is preferably installed in a combination of clamping and screwing.

In an embodiment of the present application, when the heat preservation space 12b is formed in the furnace body 200, the furnace body 200 includes a furnace inner shell 211 and a furnace outer shell 213. The furnace outer shell 213 and the furnace inner shell 211 enclose the heat preservation space 12b, and the furnace inner shell 211 is arranged close to the cover 100. The furnace inner shell 211 can be enclosed with the cover 100 to form the heating space 220.

In an embodiment, for the convenience of processing, the furnace inner shell 211 and the furnace outer shell 213 are manufactured separately, and the furnace inner shell 211 and the furnace outer shell 213 are screwed and/or riveted.

In an embodiment, the connector 242 is installed on the furnace inner shell 211.

In an embodiment, the furnace body 200 further includes a base 260, and the furnace outer shell 213 is installed on the base 260. The heat preservation space 12b provided on the furnace body 200 can play a role of heat insulation, so that the smart electric oven 10 can be safely placed on a variety of platforms, such as plastic platforms, metal platforms, wooden varnish platforms, glass platforms, etc., without damaging the platforms.

Referring to FIG. 1, in an embodiment of the present application, the smart electric oven 10 further includes a cover handle 140, one side of the cover 100 is hinged to the furnace body 200, and the cover handle 140 is arranged on the other side of the cover 100. The cover handle 140 has a grip part 142 protruding from an edge of the cover 100.

It can be understood that the setting of the cover handle 140 is configured to facilitate the user to rotate and open the cover 100 relative to the furnace body 200. While the above purpose is achieved by the cover handle 140, the setting of the cover handle 140 does not occupy the height dimension of the smart electric oven 10, so that the designed smart electric oven 10 has a smaller external dimension.

In an embodiment, to further reduce the external dimension of the smart electric oven 10, the grip part 142 is protruded from the edge of the cover 100, but does not exceed the external dimensions of other parts of the smart electric oven 10.

Further, the cover handle 140 is fixedly connected with the cover 100, such as screwing, riveting, welding, clamping and so on.

The cover handle 140 is made of metal and/or heat-resistant plastic. In an embodiment, in order to prevent the user's hands from being scalded, the material of the cover handle 140 is heat-resistant plastic. In an embodiment, in order to improve the strength of the cover handle 140, the cover handle 140 includes a heat-resistant plastic part and a metal part. The heat-resistant plastic part and the metal part snap together to form the cover handle 140, and the heat-resistant plastic part is disposed close to the cover 100.

Figures 4, 5:
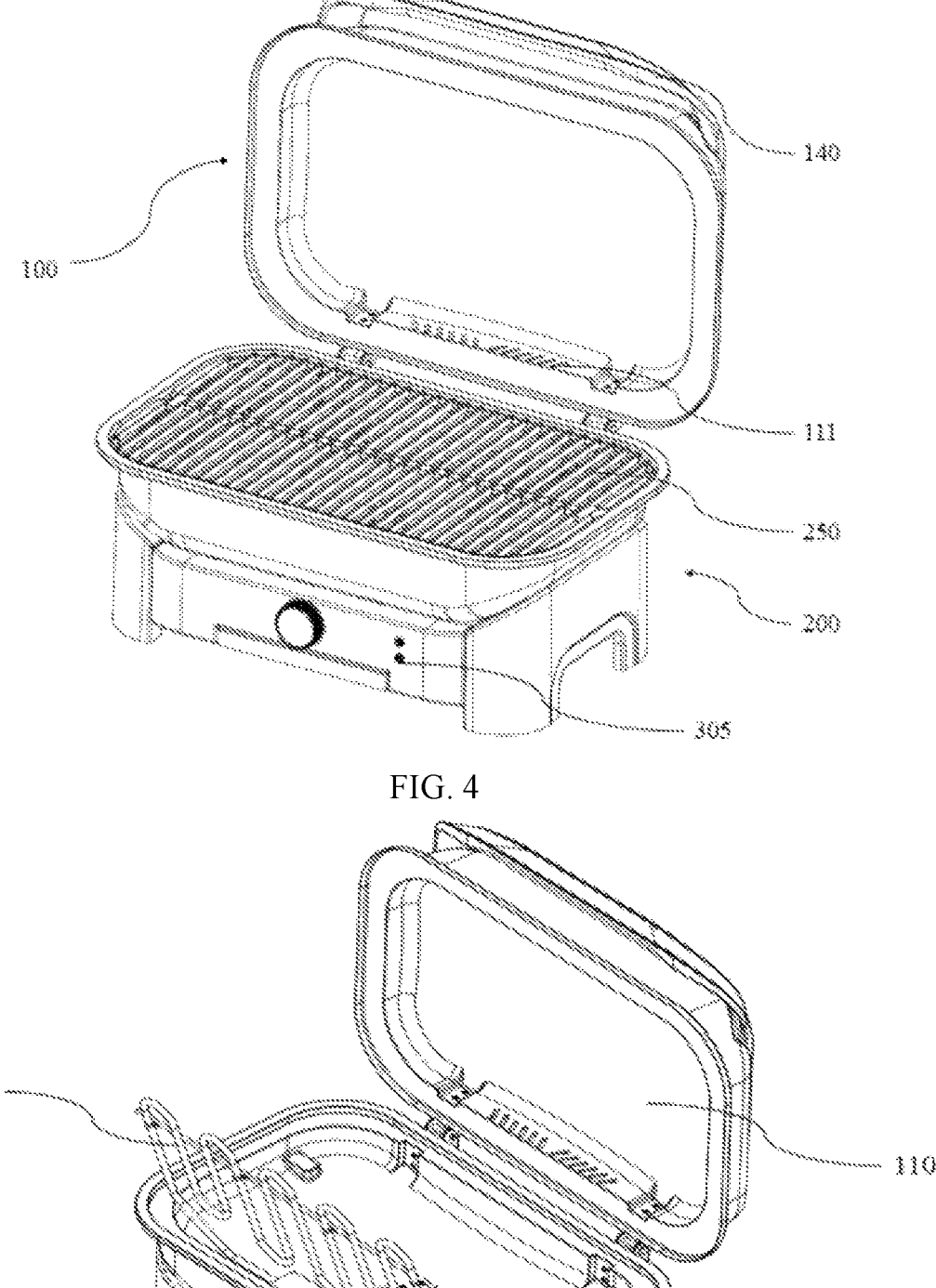
FIG. 4 is another state view of FIG. 1.
FIG. 5 is a state view of the smart electric oven according to an embodiment of the present application.

Referring to FIG. 4, in an embodiment of the present application, in order to improve the taste quality of food cooked by the smart electric oven 10, the cover inner shell 110 and the cover outer shell 130 are provided with vent holes 111 correspondingly. The vent hole 111 is configured to communicate with the heating space, the heat preservation space and the external space, so that the vent hole 111 discharges the cooking fume generated by heating the food in the heating space 220 to the external space.

In an embodiment, in order to slow down the rapid loss of heat in the heating space 220 due to the arrangement of the vent hole 111, the vent hole 111 is arranged on the peripheral side of the cover 100 instead of the upper part. To further slow down heat loss, there are multiple vent holes 111 on the cover inner shell 110.

Further, in order to improve the effectiveness of ventilation, the shape of the plurality of vent holes 111 is a waist-shaped inclined design. The vent hole 111 on the cover outer shell 130 is one and designed in a bar shape.

Figure 3:
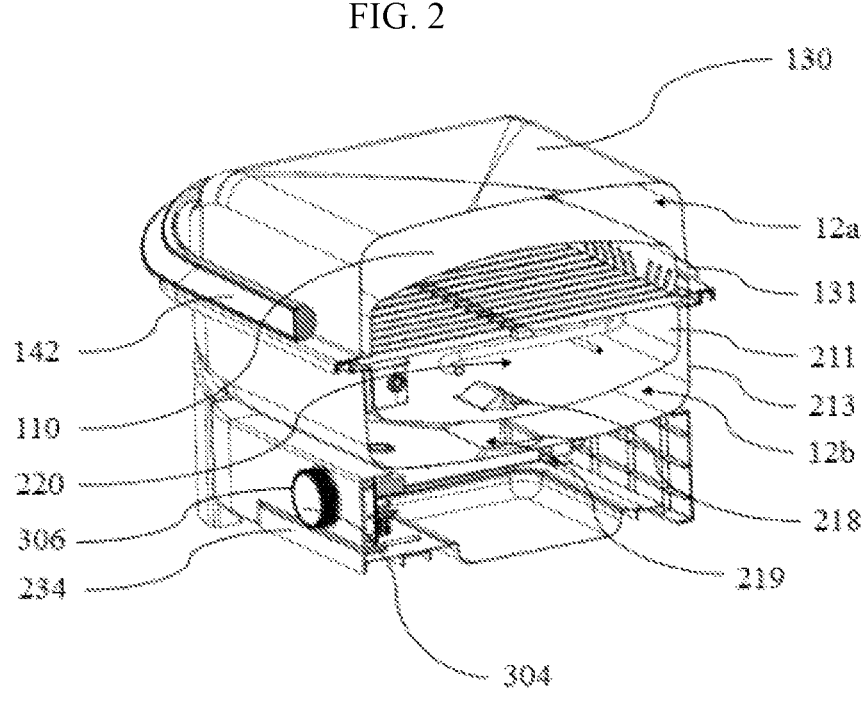
FIG. 3 is a sectional perspective view along A-A in FIG. 2.

Referring to FIG. 3, in an embodiment of the present application, in order not to affect users in the external space, the cooking fume generated by the smart electric oven 10 is not directly discharged to the upper space outside the smart electric oven 10. The cover outer shell 130 is provided with a deflector cap 131 corresponding to the position of the vent hole 111, and the deflector cap 131 is configured to change the discharge direction of the oil fume generated in the heating space 220.

It can be understood that the deflector cap 131 changes the direction of the oil fume, and can further condense the water vapor carrying the oil fume, thereby preventing a large amount of oil fume from being discharged into the air and polluting the environment.

Figure 6:
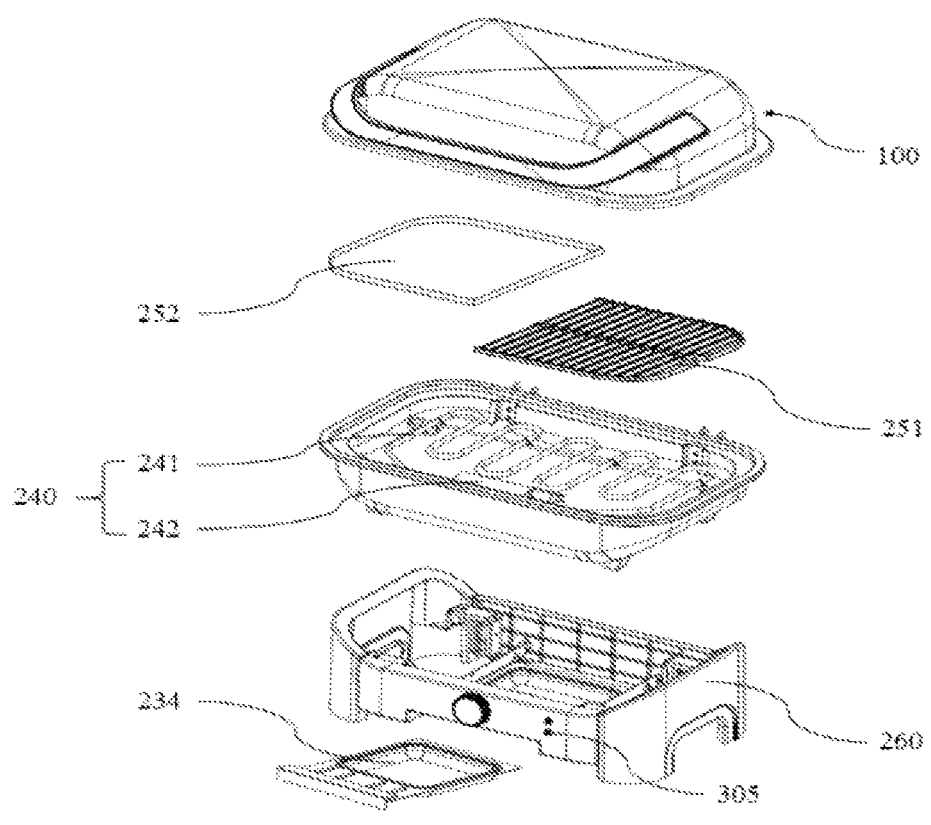
FIG. 6 is an exploded view of FIG. 1.
Figure 7:
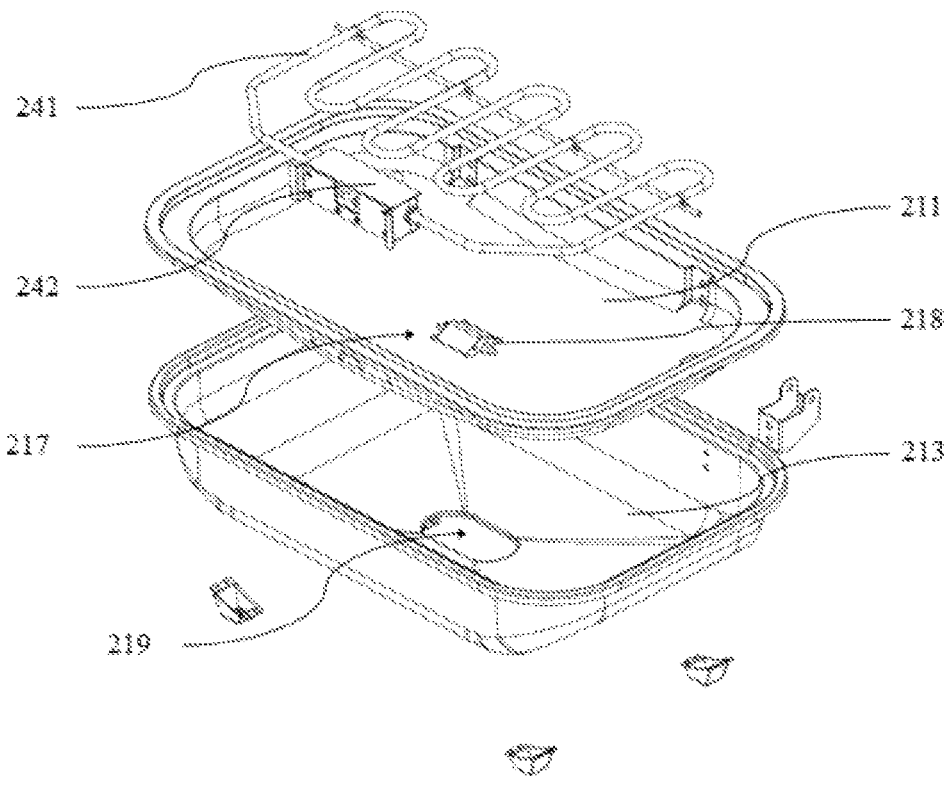
FIG. 7 is an exploded view of a part of the furnace body of the smart electric oven according to an embodiment of the present application.
Figure 8:
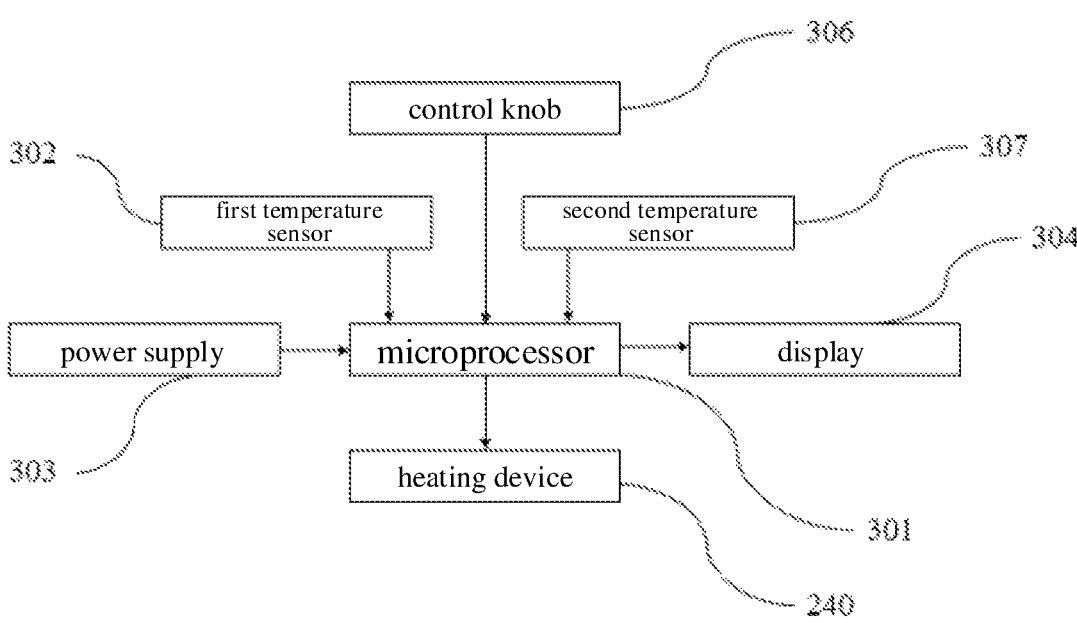
FIG. 8 is a schematic view of the connection relationship of the smart electric oven according to an embodiment of the present application.

Referring to FIG. 3 and FIG. 6, in an embodiment of the present application, in order to improve the taste quality of the food cooked by the smart electric oven 10, the furnace inner shell 211 is provided with an oil discharge device 217. The bottom of the furnace inner shell 211 is set on an arc-shaped surface as a whole, and the arc-shaped surface is concave relative to the ground. The oil discharge device 217 is arranged at the lowest point of the arc-shaped surface of the furnace inner shell 211, and the oil discharge device 217 is in an inverted V-shaped arch. The inverted V-shaped arch has two symmetrically arranged oil discharge holes 218 in the length direction.

It can be understood that the set of the inverted V-shaped arch on the oil discharge device 217 can reduce heat loss from the bottom of the furnace inner shell 211, thereby further preventing the smart electric oven 10 from damaging the platform. The heat preservation effect of the smart electric oven 10 is improved.

In an embodiment, in order to improve the oil discharge effect, the bottom of the furnace inner shell 211 is provided with an arc-shaped surface as a whole. And the oil discharge device 217 is integrally formed with the furnace inner shell 211, so that oil stains and/or residues can pass through the oil discharge hole 218 smoothly.

Referring to FIG. 6, in an embodiment of the present application, the bottom of the furnace outer shell 213 is provided with an opening 219, and the opening 219 is arranged directly below the oil discharge device 217, so that the oil stains and/or residues produced by heating food in the smart electric oven 10 can pass through the oil discharge hole 218.

It can be understood that the opening 219 is greater than or equal to the outer dimension of the oil discharge device 217. In an embodiment, to avoid direct pollution to the furnace outer shell 213, the outer dimension of the opening 219 is larger than the outer dimension of the oil discharge device 217.

Referring to FIG. 5, in an embodiment of the present application, in order to facilitate the user to clean up the oil stains and/or residues generated when the smart electric oven 10 heats food, the base 260 includes an oil collecting pan 234. The oil collecting pan 234 is arranged below the oil collecting device and/or the opening 219, and the oil collecting pan 234 is movably connected with the base 260.

Referring to FIGS. 1 to 9, in another embodiment of the present application, the furnace body 200 further includes a temperature control unit, and the temperature control unit is installed on the furnace body 200 and electrically connected to the heating device 240. The temperature control unit includes a microprocessor 301, a first temperature sensor 302, a power supply 303 and a display 304. The power supply 303 is electrically connected to the microprocessor 301, and the power supply 303 is configured to supply power to the microprocessor 301. The first temperature sensor 302 is electrically connected to the microprocessor 301, and the first temperature sensor 302 is configured to detect the temperature in the heating space 220. The microprocessor 301 is electrically connected to the display 304, and the microprocessor 301 controls the display 304 to display the temperature in the heating space 220. The microprocessor 301 is electrically connected to the heating device 240, and the microprocessor 301 can also control the heating state of the heating device 240.

Figure 9:
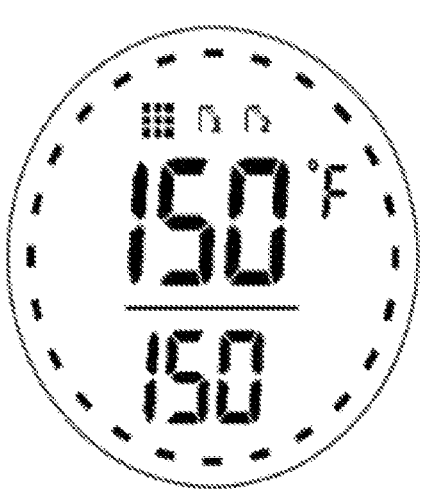
FIG. 9 is a schematic view of a display screen of the smart electric oven according to an embodiment of the present application.

Referring to FIG. 3 and FIG. 9, it can be understood that the display 304 includes a display screen 314 and a light-transmitting display surface cover. The display screen is electrically connected to the microprocessor 301, the first temperature sensor 302 is electrically connected with the microprocessor 301, and the display screen 314 can be configured to display the temperature reading detected by the first temperature sensor 302.

In an embodiment, the display screen 314 can be configured to display the temperature reading detected by the first temperature sensor 302 and a preheating temperature.

Referring to FIG. 9, in an embodiment, the preheating temperature reading displayed on the display screen 314 is directly below the temperature reading detected by the first temperature sensor 302, and the display font of the temperature reading detected by the first temperature sensor 302 is larger than that of the preheating temperature reading.

It can be understood that the microprocessor 301 is electrically connected to the heating device 240. When the temperature detected by the first temperature sensor 302 is greater than or equal to the preheating temperature, the microprocessor 301 may control to disconnect the power supply 303 to supply power to the heating device 240. When the temperature detected by the first temperature sensor 302 is not above the preheating temperature, the microprocessor 301 may control the power supply 303 to supply power to the heating device 240.

In an embodiment, the furnace body 200 further includes a second temperature sensor interface 305, and the second temperature sensor interface 305 is configured to connect a second temperature sensor externally. The second temperature sensor can be configured to detect the temperature of the food in the heating space 220, and the second temperature sensor interface 305 is electrically connected to the microprocessor 301. The microprocessor 301 controls the display 304, and the display 304 can display the temperature of the food.

It can be understood that the connection end of the second temperature sensor 307 is connected to the second temperature sensor interface 305, and the other end of the second temperature sensor 307 is in contact with the food for detecting the temperature of the food.

It can be understood that, in order to prevent failure of the interface or multiple second temperature sensors 307 can be installed, there are multiple second temperature sensor interfaces 305. Further, the second temperature sensor may be a meat probe connected externally to the smart electric oven 10 or other types of temperature sensors.

Further, in order to prevent the user from frequently pulling out or plugging in the external second temperature sensor 307 from the second temperature sensor interface 305, the temperature control unit also includes a control knob 306, which is sleeved on the periphery of the display 304. A circuit connector (not shown) is provided on the control knob 306, and the circuit connector is configured to be electrically connected with the microprocessor 301. Turning the control knob 306 can realize the temperature control of the heating pipe 241 through the microprocessor 301.

It can be understood that the user can adjust the preset temperature by turning the control knob 306, for example: turning the control knob 306 clockwise to decrease the preset temperature, and turning the control knob 306 counterclockwise to increase the preset temperature. And the display screen 314 is fixed during the process of adjusting the preset temperature by the control knob 306.

In an embodiment, in order to facilitate the user to operate the control knob 306, an anti-slip structure is provided on the outer peripheral surface of the control knob 306, and the anti-slip structure includes knurling and/or texture and/or a convex structure and/or a concave structure.

In an embodiment, the control knob 306 can also control the heating time of the heating pipe 241 through the microprocessor 301.

In an embodiment, the light-transmitting display surface cover (not shown in the figure) is provided with a circuit control part, and the circuit control part is electrically connected to the microprocessor. The light-transmitting display surface cover can be pressed to switch the display to display the temperature of the heating space 220 detected by the first temperature sensor 302 or switch the display to display the temperature of the food detected by the second temperature sensor 307.

Referring to FIG. 4 and FIG. 6, in another embodiment of the present application, the furnace body 200 further includes a frying and grilling assembly 250, and the frying and grilling assembly 250 is disposed close to the cover 100 relative to the heating device 240.

It can be understood that the frying and grilling assembly 250 can be a single grilling pan or a single grilling shelf, or the grilling and grilling assembly 250 in which the grilling pan and the grilling shelf are integrally designed.

In another embodiment of the present application, the frying and grilling assembly 250 is composed of two parts for users to flexibly use, and the frying and grilling assembly 250 includes a grilling shelf 251 and/or a grilling pan 252. It can be understood that the frying and grilling assembly 250 includes two grilling pans 252, or two grilling shelves 251, or one grilling pan 252 and one grilling shelf 251.

In an embodiment, when the frying and grilling assembly 250 is composed of a grilling shelf 251 and a grilling pan 252, one side of the smart electric oven 10 uses the grilling shelf 251 to cook food, and the other side uses the grilling pan 252 to cook food, which improves the user's cooking experience.

The above are only some embodiments of the present application, and are not intended to limit the patent scope of the present application. Any equivalent structure or equivalent process transformation made by using the contents of the specification and drawings of the present application, or directly or indirectly used in other related technical fields, is also included in the scope of the present application.

What is claimed is:

1. A smart electric oven, comprising:
a furnace body;
a heating device; and
a cover,
wherein, the cover is configured to be covered on the furnace body, and a heating space is formed between the cover and the furnace body; the heating device is provided in the heating space; a heat preservation space is formed in the cover and/or the furnace body to slow down heat loss in the heating space; when the heat preservation space is formed in the furnace body, the furnace body comprises a furnace inner shell and a furnace outer shell, and the furnace outer shell and the furnace inner shell are enclosed to form the heat preservation space; the furnace inner shell is provided close to the cover, and the furnace inner shell and the cover are enclosed to form the heating space; the furnace inner shell is provided with an oil discharge device, and a bottom of the furnace inner shell presents an arc-shaped surface as a whole; the arc-shaped surface is concave relative to the ground, and the oil discharge device is provided at a lowest point of the arc-shaped surface of the furnace inner shell; and the oil discharge device is provided in an inverted V-shaped arch, and two symmetrical oil discharge holes are provided in a length direction of the inverted V-shaped arch.

2. The smart electric oven according to claim 1, wherein when the heat preservation space is formed in the cover, the cover comprises a cover inner shell and a cover outer shell, and the cover outer shell and the cover inner shell are enclosed to form the heat preservation space; the cover inner shell is provided close to the furnace body, and the cover inner shell and the furnace body are enclosed to form the heating space.

3. The smart electric oven according to claim 1, wherein the heating device comprises a heating pipe and a connector; the heating pipe is rotatably connected to the connector, and the connector is provided on the furnace body; the heating pipe is configured to rotate around the connector.

4. The smart electric oven according to claim 1, wherein the smart electric oven further comprises a cover handle; one side of the cover is hinged to the furnace body, and the cover handle is provided on the other side of the cover; the cover handle is provided with a grip part, and the grip part is protrudingly provided on an edge of the cover.

5. The smart electric oven according to claim 2, wherein the cover inner shell and the cover outer shell are provided with vent holes correspondingly, and the vent holes are configured to connect the heating space, the heat preservation space and an external space, so that the vent holes discharge oil fume generated by heating food in the heating space to the external space.

6. The smart electric oven according to claim 5, wherein the cover outer shell is provided with a deflector cap corresponding to the vent hole, and the deflector cap is configured to change an emission direction of the oil fume generated in the heating space.

7. The smart electric oven according to claim 1, wherein an opening is provided at a bottom of the furnace outer shell; the opening is provided directly below the oil discharge device, so as to allow oil stains and/or residues generated by the smart electric oven to heat food pass through the oil discharge hole.

8. The smart electric oven according to claim 1, wherein the furnace body further comprises a temperature control unit, and the temperature control unit is installed on the furnace body and electrically connected with the heating device; the temperature control unit comprises a microprocessor, a first temperature sensor, a power supply and a display; the power supply is electrically connected to the microprocessor, and the power supply is configured to supply power to the microprocessor; the first temperature sensor is electrically connected to the microprocessor, and the first temperature sensor is configured to detect a temperature in the heating space; the microprocessor is electrically connected to the display, and the microprocessor is configured to control the display to display the temperature in the heating space; the microprocessor is electrically connected to the heating device, and the microprocessor is further configured to control a heating state of the heating device.

9. The smart electric oven according to claim 8, wherein the furnace body further comprises a second temperature sensor interface; the second temperature sensor interface is configured to connect a second temperature sensor externally, and the second temperature sensor is configured to detect a temperature of food in the heating space; the second temperature sensor interface is electrically connected with the microprocessor, the microprocessor is configured to control the display, and the display is configured to display the temperature of the food.

10. The smart electric oven according to claim 8, wherein the temperature control unit further comprises a control knob, and the control knob is sleeved on the display; the control knob is provided with a circuit connection part, and the circuit connection part is configured to be electrically connected with the microprocessor.

11. The smart electric oven according to claim 1, wherein the furnace body further comprises a frying and grilling assembly, and the frying and grilling assembly is provided close to the cover relative to the heating device; the frying and grilling assembly comprises two parts, and the frying and grilling assembly comprises a grilling shelf and/or a grilling pan.

* * * * *